United States Patent [19]

Renaudin et al.

[11] 4,388,715
[45] Jun. 14, 1983

[54] ALARM PREPROCESSOR LOGIC

[75] Inventors: Yves Renaudin, La Montgolfiere; Daniel Bordon, Les Ulis, both of France

[73] Assignee: Compagnie industrielle Des Telecommunications Cit-Alcatel, Paris, France

[21] Appl. No.: 174,059

[22] Filed: Jul. 31, 1980

[30] Foreign Application Priority Data

Aug. 3, 1979 [FR] France ................................ 79 19946

[51] Int. Cl.³ .......................... H04J 3/14; H04Q 11/04
[52] U.S. Cl. .......................................... 370/13; 370/58
[58] Field of Search ............................ 370/13, 14, 58; 179/175.2 R

[56] References Cited

U.S. PATENT DOCUMENTS 4,208,552 6/1980 Castriotta et al. .................... 370/13
4,220,824 9/1980 Castriotta et al. .............. 179/18 ES
4,302,836 11/1981 Bouvier d'Ivoire et al. ......... 370/14

FOREIGN PATENT DOCUMENTS 23689 2/1981 European Pat. Off. .............. 370/13
1544389 4/1979 United Kingdom ......... 179/175.2 R
1544390 4/1979 United Kingdom ......... 179/175.2 R Primary Examiner—Douglas W. Olms
Attorney, Agent, or Firm—Sughrue, Mion, Zinn, Macpeak & Seas

[57] ABSTRACT

An alarm preprocessing logic system for use in a computer controlled digital switching exchange including a central computer, the alarm preprocessing logic system comprising defence modules each allotted to a respective portion of the exchange for detecting a plurality of types of alarm therein and including means for forwarding detected alarms via redundant alarm data transmission means (CAa, CAb, SLM1, SLM2, COL) to alarm processing logic including: means for confirming an alarm (PT2); means for attributing a category to received alarms depending on type of alarm and on the exchange unit which originated the alarm; and means for grouping alarms according to the category attributed thereto (PT1, MDI, MAP), and for classifying alarms in an order of priority; the alarm processing system further comprising data interchange logic connecting the alarm processing logic to the exchange central computer and arranged to ensure that alarms are sent to the central computer in their order of priority.

12 Claims, 9 Drawing Figures

ALARM PREPROCESSOR LOGIC

BACKGROUND OF THE INVENTION

The present invention concerns a logic system for preprocessing alarms, applicable inter alia to centrally controlled digital switching telephone networks.

In large systems controlled centrally by a computer, alarms are transmitted over a route other than those taken by data and commands, since in the event of a major fault in one part of the system (power supply failure, for example), functional links are not able to transmit data on the nature and location of the fault.

Also, as alarms may be generated by a large number of decentralised equipments, the use of functional links to carry these would rapidly lead to congestion.

Although the computer(s) of the exchange can access all units without reference to the hierarchy of functional links, this calls for a significant amount of analysis and programming work to determine the nature of alarms and their degree of priority. This reduces the speed at which it is possible to intervene to prevent fault conditions propagating, resulting in a proportional decrease in the capacity for processing functional data.

SUMMARY OF THE INVENTION

Preferred embodiments of the alarm preprocessor logic in accordance with the invention group together alarms from the various units of the digital switching network, confirm them, decide their level of priority, pass on alarms to the exchange computer(s) in order of priority and disable processing of second level alarms generated by a major fault also triggering a first level alarm.

The present invention provides an alarm preprocessing logic system for use in a computer controlled digital switching exchange including a central computer, the alarm preprocessing logic system comprising defence modules each allotted to a respective portion of the exchange for detecting a plurality of types of alarm therein and including means for forwarding detected alarms via redundant alarm data transmission means (CAa, CAb, SLM1, SLM2, COL), to alarm processing logic including: means for confirming an alarm (PT2); means for attributing a category to received alarms depending on type of alarm and on the exchange unit which originated the alarm; and means for grouping alarms according to the category attributed thereto (PT1, MDI, MAP), and for classifying alarms in an order of priority; the alarm processing system further comprising data interchange logic connecting the alarm processing logic to the exchange central computer and arranged to ensure that alarms are sent to the central computer in their order of priority.

Preferably the alarms from the switching network units are detected by defence modules (peripherals) each comprising a time or space multiplex switch and transmitted over continuous links carrying continuous alarm supervisory signals and multiplex links carrying cyclic serial alarm supervisory logic signals.

The continuous and multiplex links carrying alarm signals from defence modules for units which are few in number per rack may be provided to two preprocessor subsystems of an alarm preprocessor and the links carrying signals from defence modules for units which are many in number per rack are provided to two access circuits combining the alarms on a single group multiplex link to said preprocessor subsystems.

The two types of link between each defence module and the alarm preprocessor logic may comprise:
continuous links carrying the direct current "power down" condition for the module in question; and
multiplex links carrying alarms from PCM channel switching units associated with the module, parity data and an alarm indicating a malfunction of the timebase associated with the module.

BRIEF DESCRIPTION OF THE DRAWINGS

Other features will appear from the following description of an example of the invention, when considered in connection with the accompanying drawings and the appended claims. In the drawings:

FIG. 9 is a flowchart showing the algorithm of an alarm configuration sequence.

DESCRIPTION OF THE PREFERRED EMBODIMENT

Figure 1:
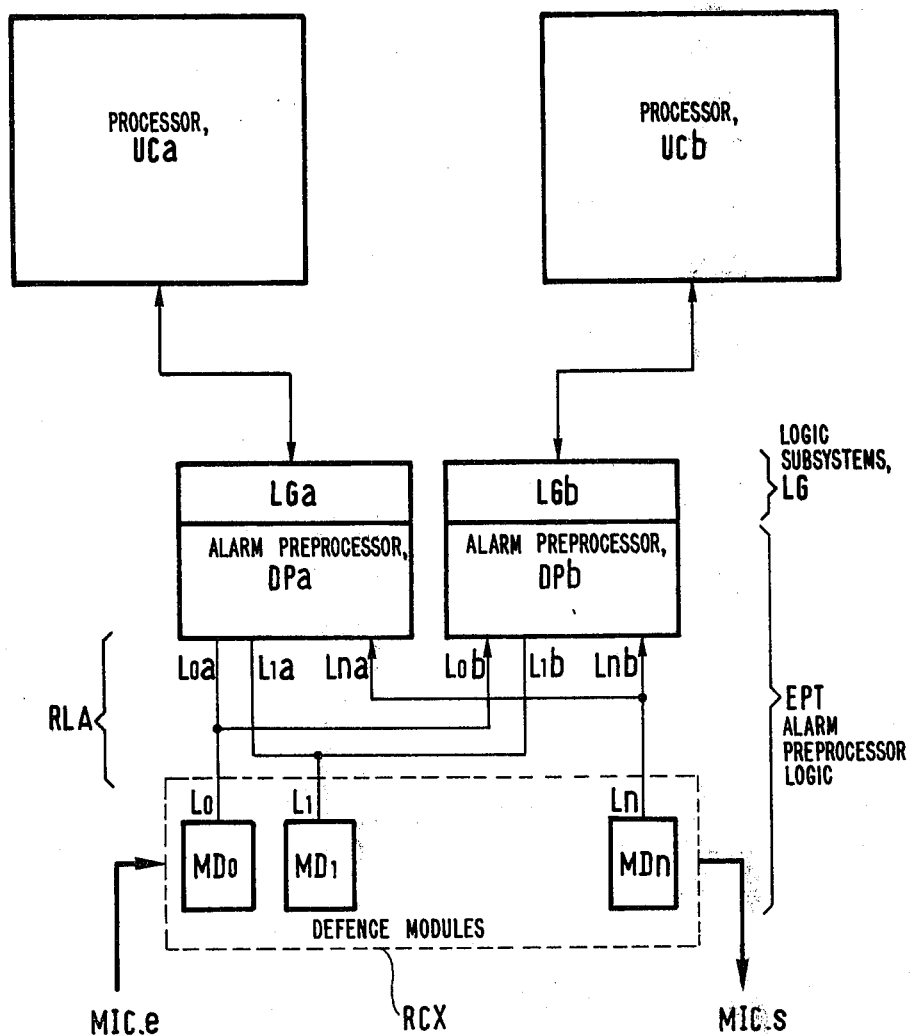
FIG. 1 shows alarm preprocessor logic according to the invention as part of a system for controlling the multiplex switching network of a telephone exchange.

Referring to FIG. 1, the alarm preprocessor logic EPT is connected to a control unit UC comprising processors UCa, UCb via central logic system LG comprising logic subsystems LGa, LGb.

An I/C and O/G PCM link switching network RCX comprises n detector peripheral modules (defence modules) MD0, MD1, ... MDn. The output of each module is connected to two alarm preprocessors DPa, DPb by a pair of two-wire links L0, L1 ... Ln each carrying the PCM link alarms, if any from that module.

Alarm preprocessors DPa, DPb are connected to respective processors UCa, UCb through respective logic subsystems LGa, LGb.

The connections linking the defence modules to the preprocessors constitute the alarm link network RLA.

Figure 2:
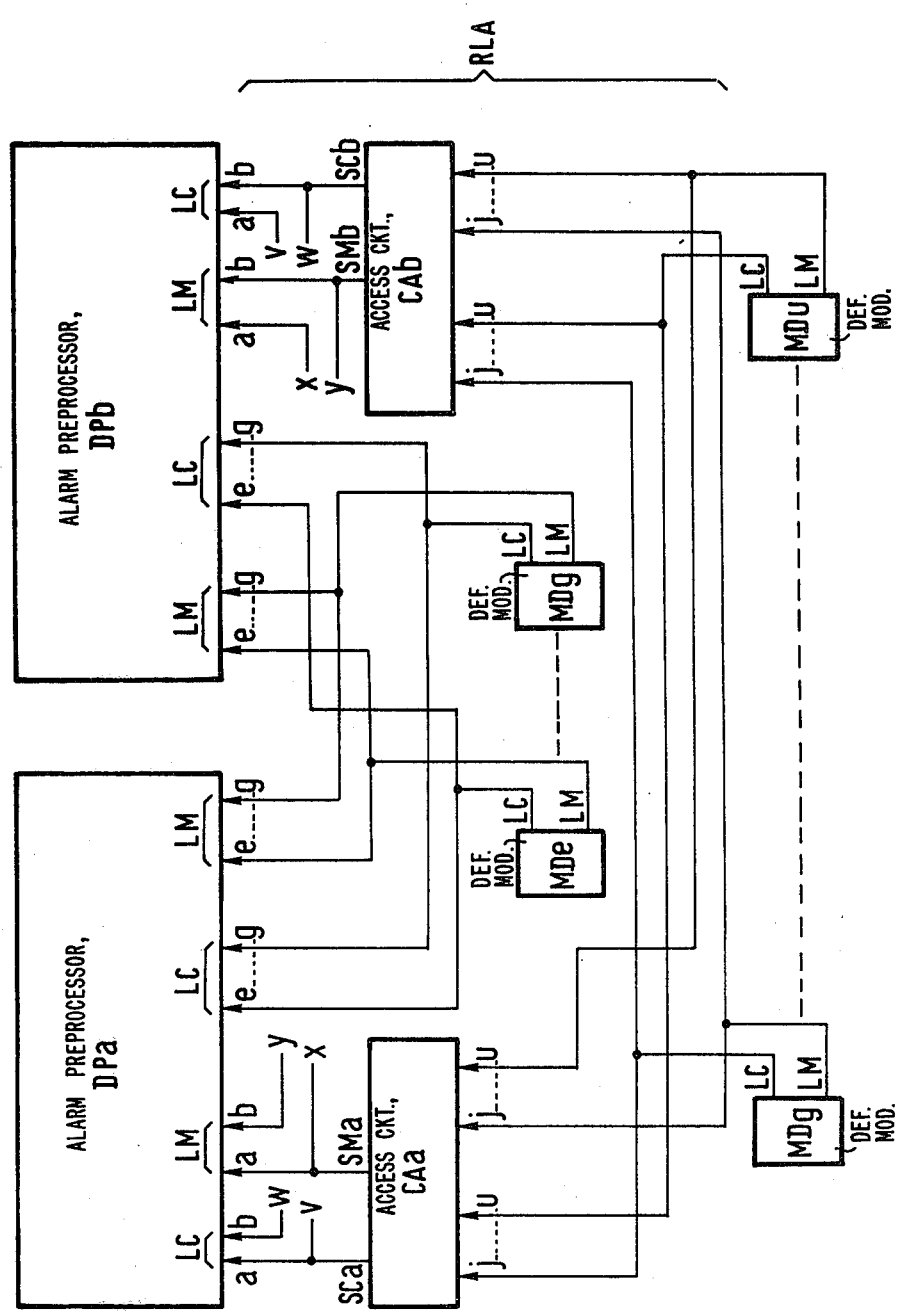
FIG. 2 is a more detailed schematic of the alarm signal network (RLA), said alarm signals accessing the preprocessor logic directly or via access circuits.

Referring to FIG. 2, each defence module comprises two types of controlled unit alarm transmission links:

a two-wire continuous link LC which continuously indicates the state of a contact indicating module power supply failure (closure of the contact of a detector loops the link to generate the "power down" alarm for the module in question); and a two-wire multiplex link LM transmitting sampled module alarm states from a multiplex circuit.

Absence of any alarm condition is signified by the cyclic transmission of a bit at logic 0. An alarm is signified by the cyclic transmission of a bit at logic 1. In practice, the alarm and non-alarm bits occur in sequence at intervals of one microsecond, a send multiplex group link thus being able to transmit up to approximately 2 000 different items of information between successive sychronising pulses from the timebase, at intervals of two milliseconds.

The alarm and other data transmitted by the multiplex links comprises:

defence module "timebase fault" alarms, parity data used to check for redundancy on reception (redundancy errors), equipment malfunction alarms (time and space multiplexers of the switching network, etc).

FIG. 2 shows the alarm link network in more detail. The network comprises:

for defence modules such as MDe to MDg which are few in number per rack, direct continuous links LCe to LCg and direct multiplexed links LMe to LMg, connecting said modules to alarm preprocessors DPa and DPb; and for defence modules such as MDj to MDu which are many in number per rack, continuous links LCj to LCu and multiplexed links LMj to LMu from said modules, grouped via a pair of access circuits CAa, CAb linked to respective preprocessors DPa, DPb.

Figure 3:
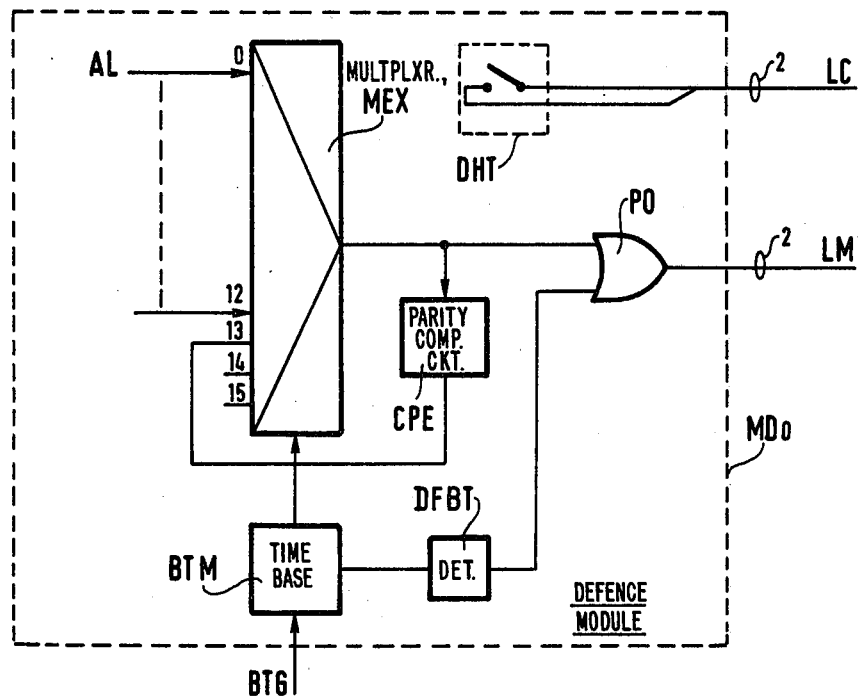
FIG. 3 shows the alarm transmission circuits of a defence module.

FIG. 3 shows the internal circuitry of a defence module MD for transmitting alarms on a multiplexed link LM. The defence modules, access circuits and preprocessors DPa, DPb each comprise a 6 MHz timebase BT controlled by a triplicated general timebase BTG with an output signal at 6 MHz sychronised at intervals of 2 ms.

Alarm lines AL from defence module MD are connected to the inputs of at least one alarm send multiplex MEX with 16 inputs 0 to 15. Its output is connected to multiplex link LM via OR gate PO and to one input of the multiplex via a send parity computation circuit CPE which outputs one parity bit.

The alarm from timebase BTM is transmitted over link LM via detector DFBT and gate PO, forcing all bits on LM to 1.

This saves one link per module, which considerably reduces the density of the alarm link network RLA.

Figure 4:
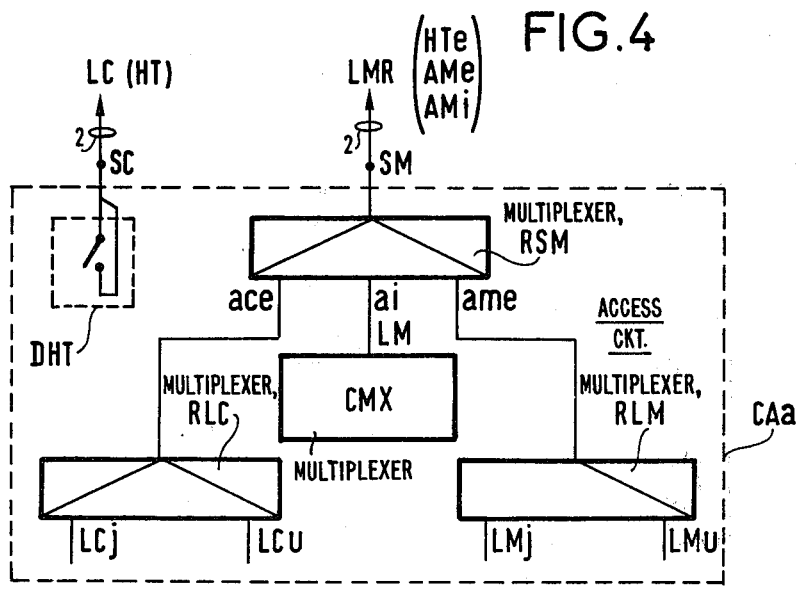
FIG. 4 shows an access circuit grouping the alarm transmission links of a plurality of defence modules.

FIG. 4 shows the arrangement of the alarm link group circuits within a preprocessor access circuit CA. Multiplex RLC groups continuous links LCj to LCu. Multiplex RLM groups multiplex links LMj to LMu. The output of multiplex RLC is connected to input ace of multiplex alarm signal group multiplex RSM. The output of multiplex RLM is connected to the input ame of multiplex RSM, a third input ai of which receives access circuit internal alarms from an alarm multiplex circuit CMX identical to that of a defence module (FIG. 3). The output LMR of multiplex RSM thus carries serial sampled status indications (one alarm per status):

"power down" alarms (HTe) external to the access circuit, from defence module links LC;

external multiplex alarms other than "power down" (Ame), from the LM links from said modules;

multiplex alarms other than "power down" internal to the access circuit (AMi).

Figure 5:
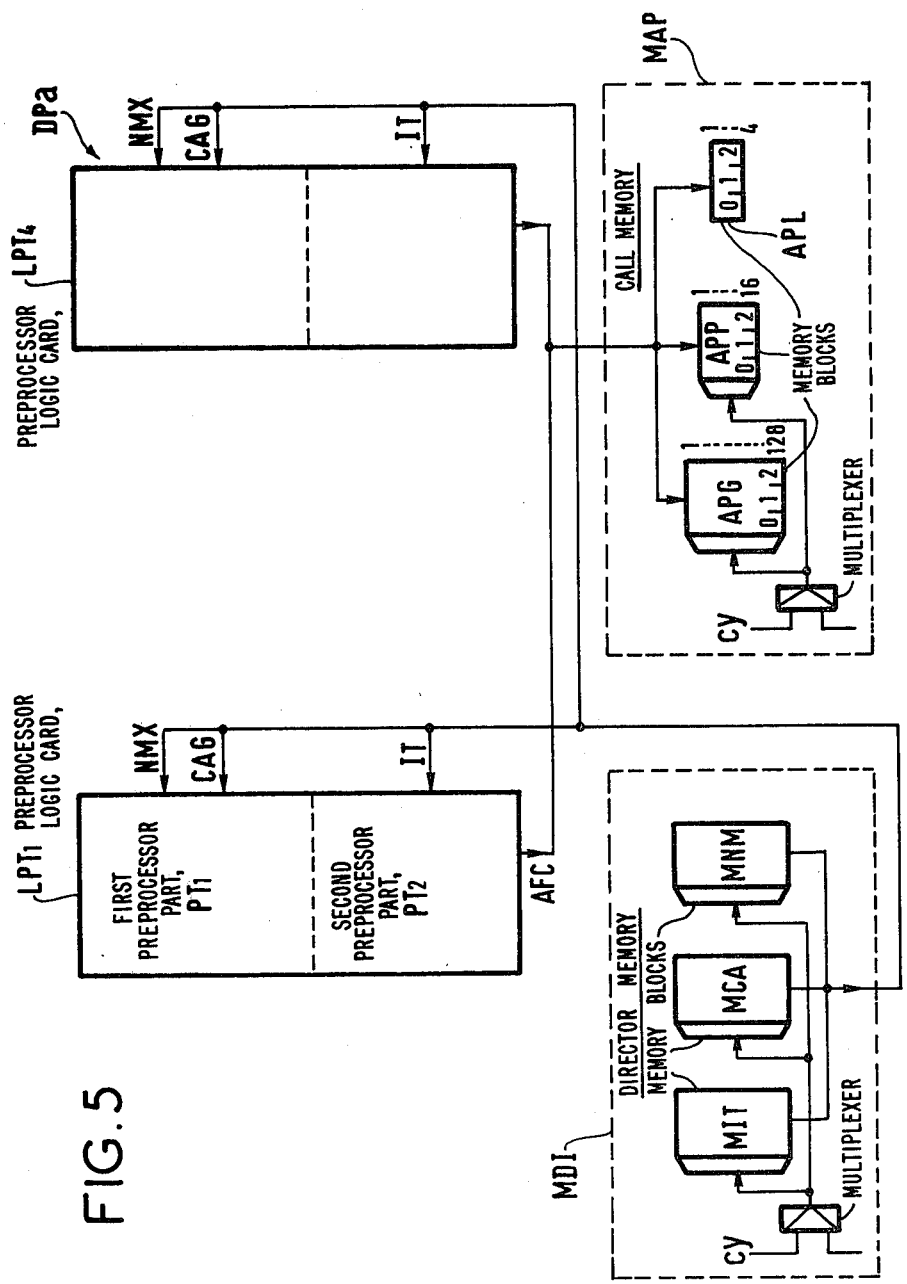
FIG. 5 shows a director memory (MDI) of the preprocessor logic circuits (LPT) of an alarm preprocessor (DPa), and a call memory (MAP) for said logic circuits for confirmed alarm conditions, and their interconnections in cyclic operating mode.
Figure 8:
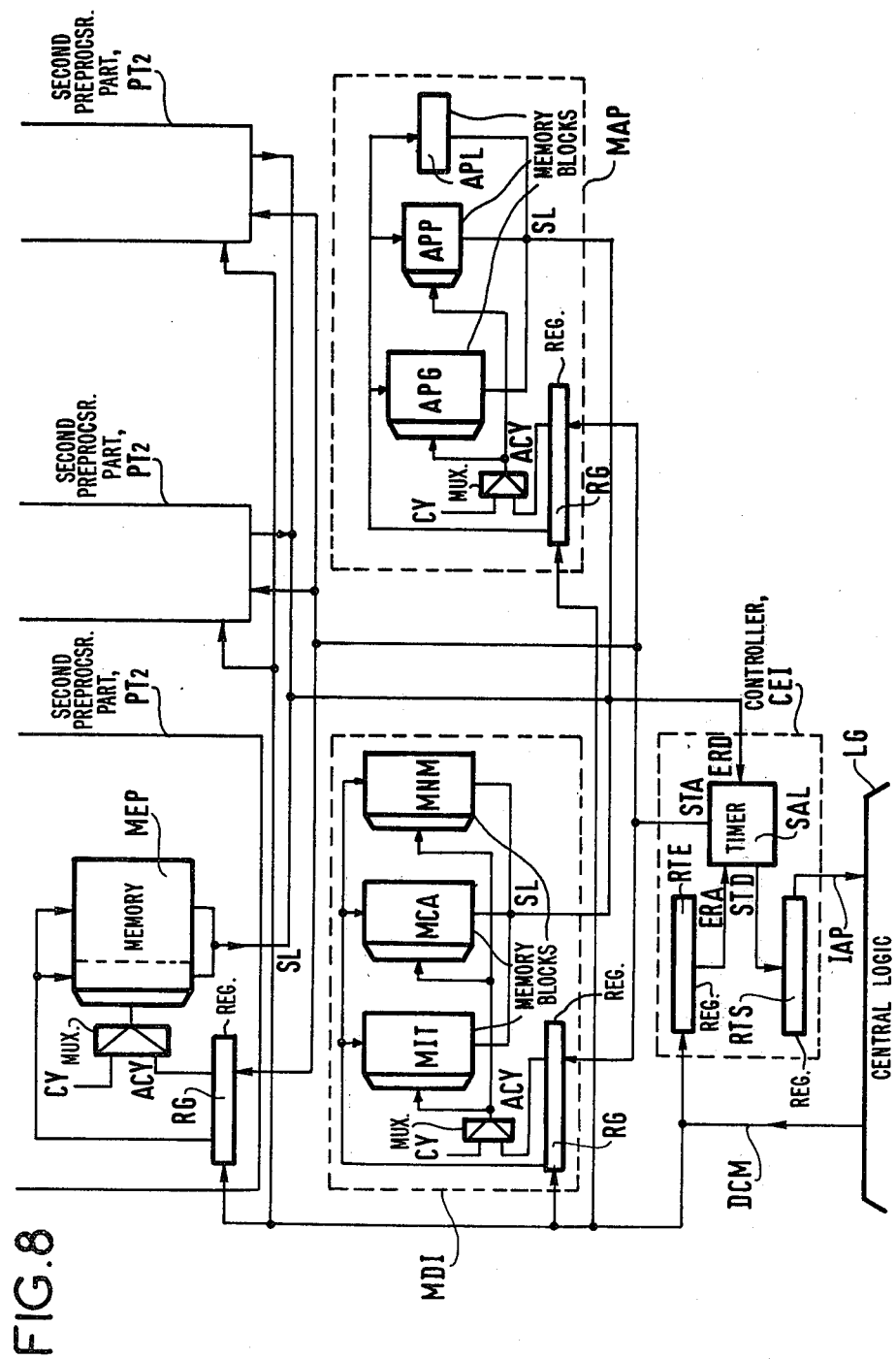
FIG. 8 shows the links between the preprocessor logic circuits, the director memory and the call memory and the central logic and its interface.

Each preprocessor DBa, DBb (FIGS. 1 and 2) is organised into preprocessor logic groups, each of which has access to the central logic. Each group may comprise up to four preprocessor logic circuits (cards) LPT1 to LPT4 (FIG. 5), with access to common units comprising:

a director memory MDI advising logic cards LPT of numbers and categories of peripheral multiplexes transmitting alarms (FIGS. 5 and 8);

call memory MAP storing confirmed alarm conditions according to priority level, supplied by logic cards LPT; and controller CEI, handling data interchange with the central logic (FIG. 8).

Preprocessor logic card LPT1 (FIG. 5) is in two parts:

the first part PT1 cyclically scans a group of continuous links and a group of multiplex links, filters logic signals associated with "power down" alarms, computes the parity bit to determine a "redundancy" error condition in the case of incorrect reception of multiplex link signals, and recognises new alarm conditions, according to link group number and/or alarm category;

the second part PT2 stores alarm conditions from the preceding cyclic scan and alarm condition confirmation phase.

FIG. 5 shows director memory MD1 and call memory MAP common to preprocessor logic cards LPT1 to LPT4, and their cyclic mode link circuits. The director and call memories are addressed synchronously and cyclically by the timebase (links CY).

Director memory MDI comprises three memory blocks MNM, MCA, MIT of the same capacity (512 words), each memory block having a word of the same rank addressed in read mode during each group of 16 alarm conditions received by logic cards LPT.

The multiplex number memory block MNM transmits over links MNX to the first preprocessor part PT1 of logic cards LPT the number of a peripheral multiplex (defence module) currently sending alarm conditions to one of said logic cards. Category memory block MCA uses links CAG to output the category to which the 16-bit group output serially by said multiplex belongs.

The processor disable memory block MIT outputs a stored disabling word to the decision-making logic circuit of the second preprocessor part PT2 if this word is previously specified by the central logic.

The second preprocessor logic card parts PT2 output "end of confirmation" calls for confirmed alarm conditions, accompanied by a priority level, using links AFC.

These calls are stored in call memory MAP in three memory blocks of differing capacity:

memory block APG has a capacity of 128 words and stores confirmed alarm conditions in priority levels 0, 1 and 2, in groups of 16, each confirmed alarm condition being stored in one of the 128 words representing the groups of 16 alarm bits;

memory block APP has a capacity of 16 words, each word storing a confirmed alarm condition according to priority level in a "packet" of eight groups of 16 alarms;

memory block APL has a capacity of four words, each word storing a confirmed alarm condition per logic card LPT.

This structure enables the central logic to search quickly through the co-ordinates of confirmed alarm conditions.

Figure 6:
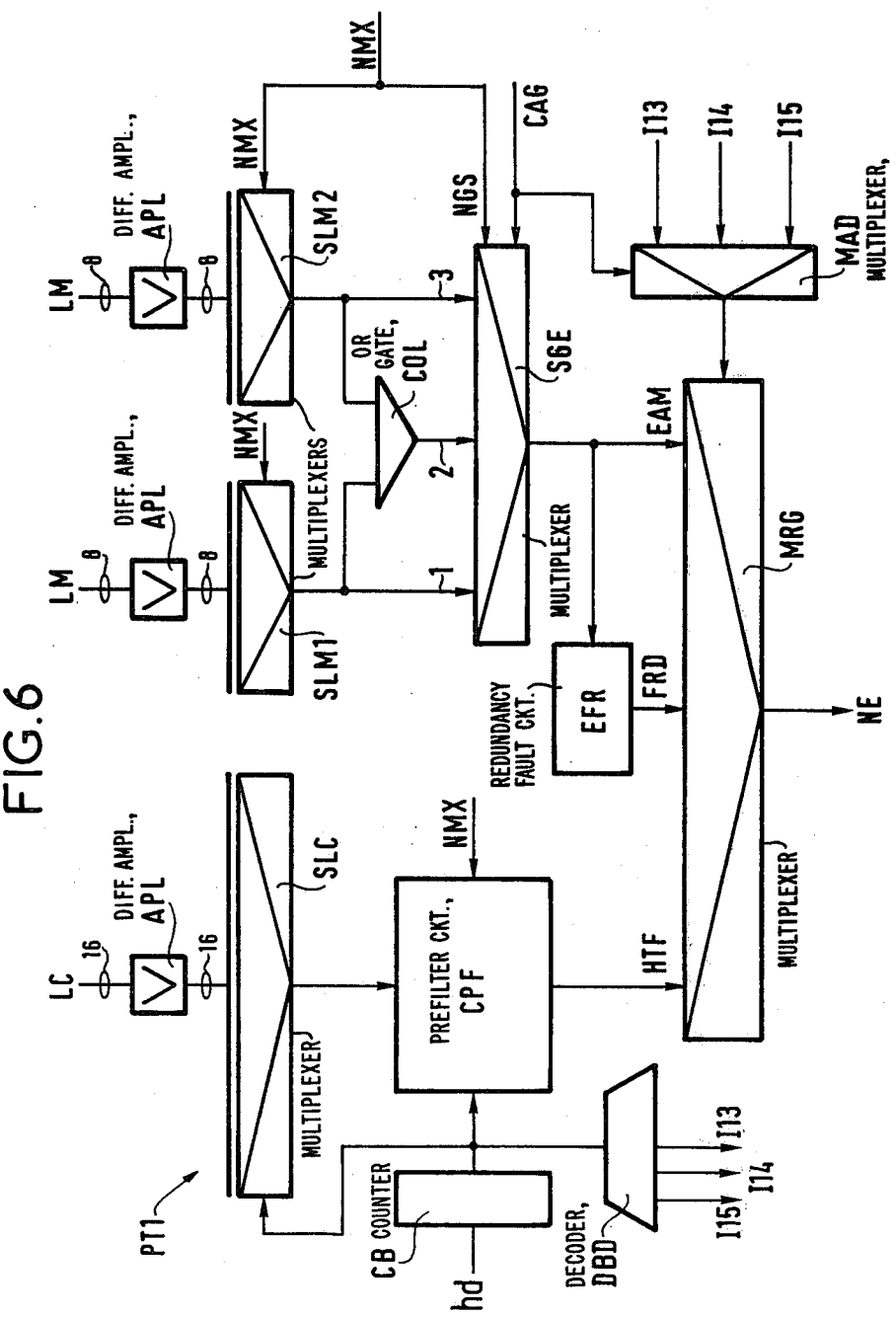
FIG. 6 shows the circuitry of the first part (PT1) of one of the preprocessor logic circuits of an alarm preprocessor (DPa)

FIG. 6 shows the circuitry of the first part PT1 of preprocessor logic card LPT1 and the control circuits of director memory MDI common to a preprocessor logic group.

The continuous and multiplex links from the switching network defence modules are connected in respective groups of 16 to the preprocessor logic inputs: one group of 16 two-wire "power down" alarm links LC (one alarm per pair of links) and one group of 16 two-wire multiplex alarm links LM. The two-wire links are converted into half the number of one-wire links by differential amplifiers APL. A group of 16 "power down" continuous alarm signal links LC is connected to the inputs of a continuous link select multiplex SLC. Respective subgroups of eight multiplex alarm links LM are connected to the inputs of a pair of multiplexes SLM1 and SLM2 which select multiplex links LM.

The input links of multiplexes SLM1, SLM2 are formed into groups of 16 links and selected by links NMX of director memory MDI, according to the multiplex link numbers of the sending peripherals (defence modules and access circuits) entered in said memory.

Outputs S1 and S2 of multiplexes SLM1 and SLM2 are connected directly to inputs 1 and 3, respectively, of serial alarm condition group select multiplex SGE. They are connected to input 2 of said multiplex via an OR gate COL. Thus according to number NMX, one of 16 multiplex links is selected at input 1 or 3 of SGE, according to whether it is in the first or second "packet" of eight links connected to SLM1 or SLM2. OR gate COL selects at input 2 of multiplex SGE a multiplex link from one or other access circuit to one or other packet of eight links when synchronous transmission is in progress on the same ranked link in each packet. This is the case with a multiplex link carrying secondary alarms (alarms from a "secondary" defence module) simultaneously in transit on the two access circuits, of said "primary" defence modules.

The serial multiplex alarm condition group select multiplex SGE is addressed by links NGS derived from NMG, said links carrying the most significant bit of the multiplex link number and designating a group of multiplex alarm conditions, this addressing mode allowing for the category of said group designated by links CAG of director memory MDI.

Bit group categories are defined as follows: the multiplex circuits of the defence modules and access circuits have a modular bit transmission capacity (alarm or non-alarm indicators, according to logic state) of 16 bits. Assuming the number of alarms AL transmitted by a defence module is greater than the capacity of the first multiplex, a second 16-input multiplex (not shown) is allocated to said module, the output of said multiplex being connected to multiplex link LM (FIG. 3) via gate PO. Multiplex MEX operates in conjunction with parity compute circuit CPE and with timebase fault detector DFTB. It is the "principal" multiplex, and the 16-bit group it transmits is the "principal" group, since this group may indicate a timebase fault identified as of major importance since it disturbs the state of PCM channel alarm bits AL.

Access circuit multiplex RLC (FIG. 4) also has 16 inputs and the serial groups of 16 bits indicating multiplex "power down" alarm conditions are also "principal" groups. The principal 16-bit groups are allocated category code 0 or 2, according to whether they are sent by an access circuit or defence module.

The multiplexes additional to multiplex MEX and transmitting only groups of 16 PCM channel alarm bits (alarms other than "timebase fault" and "power down") are allocated category code 1 or 3, according to whether they are sent by an access circuit or defence module.

A binary counter CB dividing by 16 (FIG. 6) and controlled by timebase signals hd scans successive inputs of multiplex SLC (one 16 microsecond scan cycle every 2 milliseconds). It synchronises prefilter circuit CPF connected to the output of multiplex SLC. The function of circuit CPF is to confirm multiplex "power down" alarms at the output of multiplex SLC, inserting a time-delay of $4 \times 2$ ms to guard against contact bounce at the detector relays.

Prefilter circuit CPF comprises a memory of 16 words $\times 3$ bits. A first bit designates the "filtered" (ie memorised) power down condition. The other two bits designate the number of scans (four maximum) effected by counter CB, at a rate of one 16 microsecond scan every 2048 microseconds. On each scan the new state of a "power down" alarm link is compared with the former state by a logic gate circuit, and rewritten into the corresponding memory word via a buffer register. The memory is addressed according to the sending peripheral multiplex designated by links NMx.

A group multiplex MRG receives the filtered "power down" alarm conditions from the prefilter circuit (link HTF), the multiplex alarm conditions EAM at the output of multiplex SGE, and redundancy fault conditions FRD signalled by a redundancy fault circuit EFR which checks the parity of bits received from the defence modules.

Multiplex MRG is addressed via addressing multiplex MAD which is enabled according to the category of the serial bit group currently being transmitted (link CAG).

Multiplex MAD receives from a binary-decimal decoder DBD controlled by binary counter CB time intervals i13 and i15 (links I13 and I15) which are used to write the "power down" and "redundancy" conditions, respectively. The other multiplex alarm conditions present at EAM are present at output NE of MRG during time intervals i0 to i12 or i0 to i15, according to the bit group category.

Figure 7:
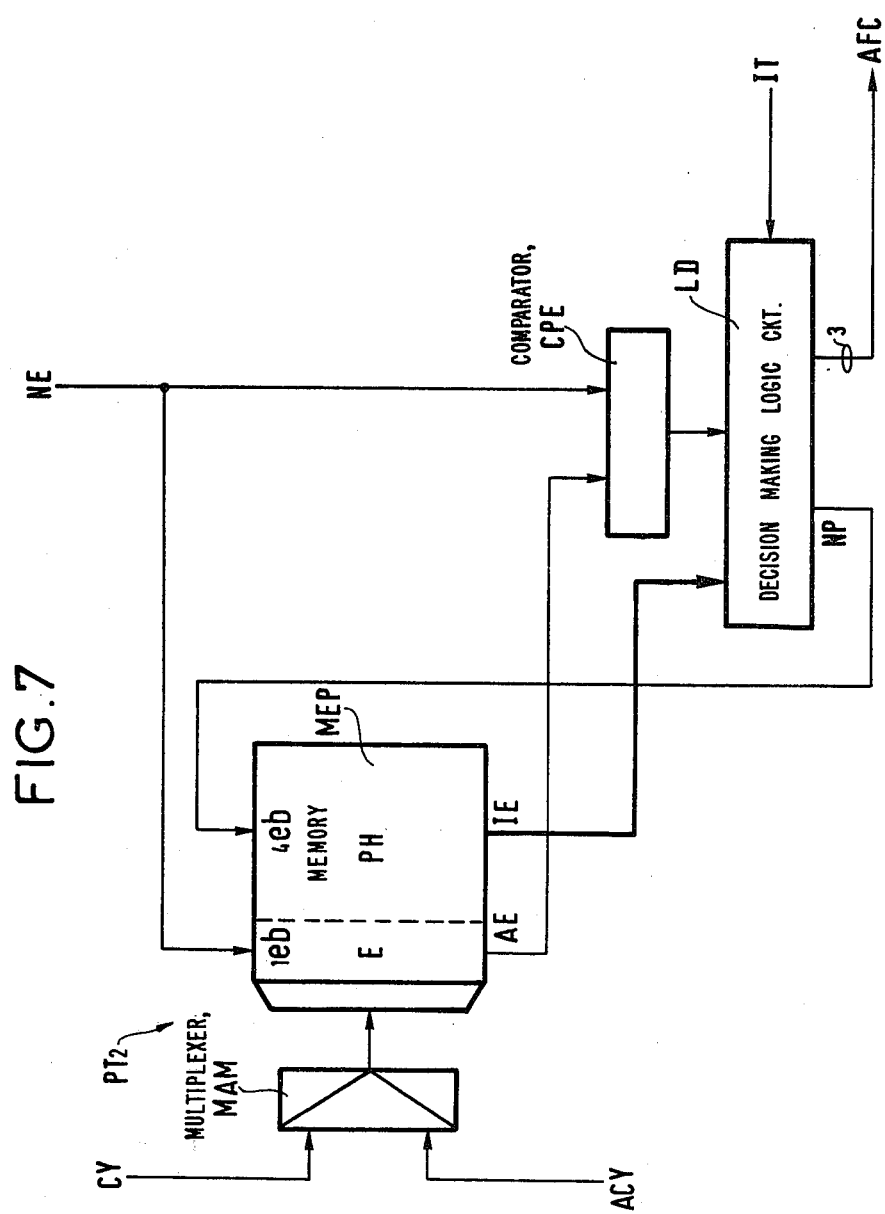
FIG. 7 shows the circuitry of the second part of said preprocessor circuit (PT2)

The preprocessor logic PT2 shown in FIG. 7 confirms alarms after generating a number of time-delay phases which varies with the alarm category. It comprises condition-phase association memory MEP of 2048 words divided into 128 groups of 16 words. Each word includes one bit indicating the former alarm or non-alarm condition AE (previous memory scan) and four bits indicating the preceding state or phases of said condition, namely an idle phase or initial phase from which the alarm condition is confirmed at the end of a number of confirmation phases or memory cycles dependent on the category of the serial bit group processed and the type of alarm.

Memory MEP is addressed cyclically by the timebase (link CY) via memory addressing multiplex MAM, in which addressing is synchronous with that of the module multiplexes. The alarm conditions selected by logic card PT1 are input by link NE (new condition) to alarm condition field E of memory MEP and to condition comparator CPE, which receives at output AE from field E the previously memorised former condition. The result of the comparison is transmitted to decision-making logic circuit LD, as is the number of the initial memory scan phase or that of the current scan phase (link IE). On the basis of this information, decision-making logic circuit LD inserts the number of the next scanning phase in phase field PH of memory MEP (output NP of LD) and outputs (or not) an end of confirmation call (link AFC) when the last scanning phase is transmitted to it.

Decision-making logic circuit LD discriminates end of confirmation calls on the basis of a processing priority level which depends on the type of alarm: power down (HG), timebase fault (FBT), redundancy fault (FRD), and their origin: primary and/or secondary defence module.

Decision-making logic circuit LD comprises two integrated circuit packages containing 256 words×4 bits of programmable memory. One stores the various phases and the other the call processing priority levels.

The table below summarises the classification of alarms and their confirmation processing. The defence modules MD are listed as primary defence modules MDP (access circuits) and secondary defence modules MDS sending alarms from the switches to the preprocessors via said primary defence modules.

The primary and secondary defence modules output alarm signals in the form of serial groups GES each of 16 bits.

| MD | GES | CAT | TA | PHI | CEM | NA | IT |
|---|---|---|---|---|---|---|---|
| MDP | GP | 0 | HT | 3 | 1 | | |
| | | | FBT | 2 | 2 | 0 | 3 |
| | | | FRD | | | | |
| | AG | 1 | AA | 0 | 5 | 2 | 2 |
| MDS | GP | 2 | HT | | | | |
| | | | FBT | 1 | 4 | 1 | 3 |
| | | | FRD | | | | |
| | AG | 3 | AA | 0 | 5 | 2 | 1 |

MD: Defence module
GES: Serial bit group
CAT: Bit group category
TA: Type of alarm
AG: Other groups
PHI: Initial phase
CEM: Memory scan cycle
NA: Call level
IT: Processing disabled
AA: Other alarms The first 16-bit group is the "principal" group GP since, at preprocessor (PT) level, it incorporates the three "principal" alarms HT, FTB, FRD, distinguished from the other alarms AA issued by the PCM channel switches of the switching network.

The alarm types (TA) include:
"power down" HT;
"timebase fault" FBT;
"redundancy fault" FRD;
other alarms AA (not HT, FBT, FRD).

The principal group GP of serial bits GES of a primary defence module is allocated to categroy (CAT) 0. The other groups AG (alarms (AA) other than the principal alarms) are distinguished by category 1. The principal bit group of a secondary defence module is allocated to category 2. Other groups are distinguished by category 3.

Associated with each type of primary or secondary alarm in decision-making logic circuit LD is an initial phase number PHI, a number of memory scanning cycles or phases CEM (condition-phase memory MEP)) and a call level. There are three call levels 0, 1 and 2, level 0 having the highest priority and level 2 the lowest priority. When the alarm condition has been confirmed, decision-making logic circuit LD places a call on wire 0, 1 or 2 of link AFC, according to the priority level of the confirmed call.

Confirmations of change of state and the corresponding calls may be selectively disabled by a "processing disable" bit IT from the director memory. This applies to all or part of a 16-bit group. According to its value, it affects:
principal primary alarms (IT=3);
other alarms AA of principal group or other groups (IT=2);
principal secondary alarms (IT=3);
other alarms AA of principal group or other groups (IT=2).

16 phases organised into four different processing sequences control confirmation of alarm conditions according to the type of alarm and origin, these sequences being self-contained and defined by interworking of condition-phase memory MEP and decision-making logic circuit LD (FIG. 7).

The flowchart of FIG. 9 shows the algorithm of the alarm confirmation sequence implemented by the second part of the preprocessor logic.

The four sequences SQ1 to SQ4 are given by way of example only. Sequence SQ1 processes confirmation of principal primary alarms (APP) of the "power down" type (HT) allocated to priority level 0 (NO).

Sequence SQ2 processes confirmation of principal primary alarms of the "timebase fault" type and "redundancy fault" type allocated to level 0.

Sequence SQ3 processes confirmation of principal secondary alarms (ASP) in level 1. Sequence SQ4 processes confirmation of other primary or secondary alarms (AAPS) of level 2. The operation of logic card PT2 (FIG. 7) is explained below as an application, given by way of example only, of sequence SQ2, showing the confirmation processing of primary alarms (AP) in priority level 0 (NO) and of the "timebase fault" and "redundancy fault" type (FBD, FRB).

According to whether a new alarm condition appears on NE at time i13, i14, or i15 in a group of 16 serial bits transmitted at times i0 to i15, condition-phase memory MEP stores conditions originating with an HT, FBT or FRD alarm, and transmits to decision-making logic circuit LD an initial phase PH according to the origin (primary or secondary module) of the alarm.

In the case of a timebase fault, for example, the confirmation sequence starts from initial phase 2. If the new condition is not different to the former condition ae stored on the preceding cycle of memory MEP, decision-making logic circuit LD rewrites the initial phase into said memory (loop NP). If ne ≠ ae and if processing is not inhibited (IT<3), the decision-making logic circuit transmits a confirmation phase number (phase 8, for example) to memory MEP.

After a first complete memory cycle, memory MEP has written the new phase (8) in place of the initial phase 2 and started a second memory cycle. At the end of this cycle the new/former condition comparison test is repeated. If ne ≠ ae and if processing is not disabled, the level 0 call is fed to AFC by LD and the terminal phase 11 of the sequence is written in the phase memory. If processing is not disabled after initiating the call, the call remains effective; if not, the decision-making logic circuit reinitialises the phase memory word to initial phase 2.

FIG. 8 shows the circuits for interchanging data between preprocessor memories MDI, MAP and MEP and central logic LG, such interchanges being effected in acyclic addressing mode (window reserved for one-off interventions requested by central logic LG).

The cyclic and acyclic memory addressing modes are closely linked, the clock signals controlling memory addressing being each subdivided into two time-intervals of one microsecond:

a cyclic operating interval in which the memories and their associated circuits effect repetitive and systematic scanning tasks;

an acyclic operating interval used to address the memories in read or write mode (for or by central logic).

Condition-phase memories MEP of logic card PT2 and memories MAP, MDI common thereto are addressed in acyclic mode by central logic LG via data interchange controller CEI, to enable said central logic to read or write said memories.

Controller CEI has an addressing and read sequence timer SAL associated with an input buffer register RTE and an output buffer register RTS. Register RTE and registers RG of the memories receive the acyclic memory address (serial message from central logic) via link DCM. Sequence timer SAL is positioned according to the address received on inputs ERA, and passes this from its outputs STA to a register RG of said memory. Said sequence timer can also operate in address increment mode. The read outputs SL of the memories are connected to data receive inputs ERD of sequence timer SAL which scans said outputs. The read data is transferred in parallel into registers RTS by outputs STD of sequence timer SAL, and then transferred serially to central logic LG by link IAP which thus sends preprocessed alarm data.

To read memory MAP, sequence timer SAL first scans a memory block APL in which the preprocessor logic call status may be memorised. It acquires the group "packet" and block group indications APP and APG, signifying that the confirmed alarm condition calling the call memory belongs to a "packet" of groups and to a given group of serial bits, and the address in the group by reading MEP, said bits being obtained from corresponding peripheral multiplex MEX.

In the central logic, data relating to alarm preprocessing is stored and accessible to the central unit CU software. The "software" alarm condition corresponding to the confirmed condition is updated by the central unit.

Central logic can write data into the preprocessor memories. To this end, it transmits the address and the data in series on link DCM to register RG of the addressed memory. The register then transfers the data in parallel to the addressed memory line and into register RTE of the sequence timer, to increment the address via the outputs STA of the sequence timer.

"Disable processing" data for a group of alarms is thus written into memory block MIT at the address of a peripheral multiplex which has sent a "timebase fault", "power down" or "redundancy fault" alarm, such faults disrupting the logic states of the entire serial bit group, the alarm indications of which become meaningless.

We claim:

1. An alarm preprocessing logic system for use in a computer controlled digital switching exchange including a central computer, the alarm preprocessing logic system comprising: defence modules each allotted to a respective portion of the exchange for detecting a plurality of types of alarm therein; means for forwarding detected alarms via redundant alarm data transmission means (CAa, CAb, SLM1, SLM2, COL) to alarm processing logic including (i) means for confirming said alarms (PT2) (ii) means for attributing a category to said alarms depending on type of said alarm and on the exchange unit which originated the alarm and (iii) means for grouping said alarms according to the category attributed thereto (PT1, MDI, MAP), and for classifying said alarms in an order of priority; the alarm processing system further comprising: data interchange logic connecting the alarm processing logic to the exchange central computer and arranged to ensure that said alarms are sent to the central computer in said order of priority.

2. Logic system according to claim 1, wherein the means for forwarding said alarms from the defence modules each comprise a detector (DHT) responsive to the "power down" state of the switch by placing a continuous alarm signal on a continuous link (LC), at least one multiplexer (MEX) controlled by a timebase (BT) for transmitting multiplex alarm conditions (AL) pertaining to PCM channels of the switch on a multiplex link (LM) via an OR gate (PO), a second input of said OR gate being connected to a timebase fault detector (DFBT), the output of said multiplexer being looped to one of its inputs via a circuit (CPE) for computing the parity of the multiplexed alarm conditions.

3. Logic system according to claim 2, wherein the continuous and multiplex links (LC, LM) from the defence modules carrying respectively the continuous "power down" alarm conditions and multiplexed alarm conditions other than "power down" are grouped via two access groups (CA), each access circuit comprising 2n inputs connected to said links and two outputs (SM, SC) provided to the two preprocessors (DPa, DPb), n inputs receiving the continuous links (LC) of a group of defence modules of a continuous link group multiplexer (RLC) and n inputs receiving the multiplex links of said group on a multiplex link group multiplexer (RLM), the output of each of said continuous and multiplex link group multiplexers being connected to inputs of a multiplexer (RSM) grouping said multiplex "power down" alarm conditions and alarm conditions other than "power down", issued respectively by the continuous and multiplex link group multiplexers, said alarm conditions external to the access circuit being retransmitted on a group multiplex link (LMR) from the output of the multiplex signal group multiplexer (RSM) which constitutes a first output (SM) of the access circuit.

4. Logic system according to claim 3, wherein the access circuit internal alarm conditions other than "power down" are output to the first output (SM) of said access circuit via the multiplex signal group multiplexer (RSM), one input of which is connected to an alarm condition multiplexer (CMX) identical to that of a defence module, the "power down" alarm of the access circuit being transmitted to a second output (SC) of said access circuit identically to the "power down" alarm of a defence module.

5. Logic system according to claim 1, wherein each alarm preprocessor comprises a number of preprocessor logic circuits (LPT) each comprising a multiplexer (SLC) grouping the defence module and access circuit continuous links (LC) and a multiplexer (SLM) grouping the defence module and access circuit multiplex links (LM), said multiplexers grouping the defence module and access circuit continuous and multiplex links being addressed by links (NMX) for reading multiplex link numbers stored in a director memory (MDI) common to said preprocessor logic circuits and read synchronously with the transmission phases of said links so as to select, at a rate timed by said phases, a multiplex link (LM) carrying a serial bit group and the confirmed status of the related continuous link (LC), said continuous link select multiplexer (SLC) being addressed by a time counter (CB) at the same rate as the multiplexers (MEX) of the peripheral modules are addressed, to confirm "power down" alarm conditions written in a memory circuit (CPF) addressed by signalling links (NMX) of said sending peripheral multiplexers.

6. Logic system according to claim 5, wherein the redundant alarm data transmission means comprise two multiplex links (LMa, LMb) from two access circuits (CAa, CAb), which are connected to like ranked inputs of two multiplexers (SLM1, SLM2) each selecting one of eight multiplex links, the outputs of said multiplexers being connected to a logic OR circuit (COL) at the output (2) of which are obtained the multiplexed synchronous alarm signals transmitted on the two multiplex links from the two access circuits.

7. Logic system according to claim 6, wherein the selectors of serial groups of alarm bits according to the category of said group comprise a multiplexer (SGE) with its input connected to the outputs of the multiplex link select multiplexers and the output of the OR circuit, said group select multiplexer (SGE) being addressed by the most significant bit (NGS) of the multiplex link number according to the category (CAG) of said group, said category numbers being stored in the director memory (MDI) and read synchronously with the serial bit transmission phase of said group.

8. Logic system according to claim 7, wherein the means for grouping the alarm conditions from the continuous links and the multiplex links by category and for retransmitting said status conditions serially on a single link (NE), comprise a group multiplexer (MRG) with its input connected to the output of the continuous link select multiplexer (SLC) via a circuit (CPF) for confirming "power down" alarm conditions, said input also being connected directly to the output of the multiplexer (SGE) selecting serial groups of alarm bits, and connected indirectly to said output via a circuit signalling redundancy fault conditions (EFR), said group multiplexer being addressed according to the group category by the three last steps (13, 14, 15) of said time counter (CB), in order to transmit to the output (NE) an alarm group comprising the bits indicating the principal alarms: "redundancy" fault, "timebase" fault, and "power down".

9. Logic system according to claim 8, wherein the means (MEP, CPE, LD) for confirming changes of multiplex alarm states by priority level comprise:
 a condition-phase memory (MEP) cyclically scanned (CY) synchronously with the defence module multiplexers, said memory associating a memorised alarm condition with a condition scanning phase;
 a comparator (CPE) comparing the new state of an alarm condition (link NE) and the former state (AE) stored in the condition-phase memory; and
 a decision-making logic circuit (LD) receiving from the comparator an indication of change of state and from the phase memory an indication of the initial or current scanning phase associated with said condition, said decision-making logic circuit writing the next scanning phase (MP) in the phase memory and, at the end of confirmation of the memorised alarm condition, generating a call according to a priority level (0, 1, 2) varying with the nature of the alarm and its primary origin or secondary origin.

10. Logic system according to claim 1, further comprising means for storing calls from preprocessor logic circuits (LPT) at the end of confirmation of alarm conditions, said means comprising a call memory (MAP) with memory blocks (APL, APP, APG) which are addressed cyclically and indicate respectively preprocessing logic circuits in call mode after confirmation of an alarm condition, the group "packet" and block group indication (APP), (APG) to which said confirmed alarm condition belongs and the address of the alarm within the group.

11. Logic system according to claim 7, including means for storing and cyclic mode reading of multiplexer selection data distributed to the preprocessor logic circuits comprise a director memory (MDI) with memory blocks (MNM, MCA, MIT) addressed cyclically and synchronously with the addressing of the alarm condition sending peripheral multiplexers (MEX), said memory blocks storing serial bit group numbers, categories allocated to said groups and "disable processing" indications in respect of alarm conditions for specified groups, said group numbers and group category numbers (NMX, CAG) addressing respectively multiplex link select multiplexers and logic circuit group multiplexers (PT1), the "disable processing" indications being communicated to the decision-making logic circuits (LD) of the logic circuits (PT2).

12. Logic system according to any one of claims 9 to 11, including a controller (CEI) for addressing the preprocessor memory (MEP) and memories (MAP, MDI) common to said preprocessors comprises a sequence timer (SAL) for addressing and reading said memories, associated with two buffer memories, an output buffer (RTS) receiving the data read from the memory addressed by central logic in parallel via sequence timer (SAL), and transferring said data serially to said central logic, and an input buffer (RTE) receiving the acyclic memory addressing signal serially from central logic and transferring it in parallel to a register (RG) of said addressed memory, said register receiving data to write into the memory serially from central logic and transferring said data in parallel to the inputs of the memory level addressed in write mode, timed by the sequence timer (SAL) operating as an incremental counter.

* * * * *